United States Patent

[11] 3,576,412

[72] Inventor Jean Jullien-Davin
 Valence (Drome), France
[21] Appl. No. 780,747
[22] Filed Dec. 3, 1968
[45] Patented Apr. 27, 1971
[73] Assignee Crouzet
 Paris, France
[32] Priority Dec. 12, 1967
[33] France
[31] 131985

[54] PRESSURE DROP DETECTOR WITH TESTING MEANS, CENTRIFUGAL FORCE COMPENSATING MEANS, AND TEMPERATURE COMPENSATING MEANS
3 Claims, 3 Drawing Figs.

[52] U.S. Cl. ..................................................... 200/83,
 340/410, 73/410, 73/393
[51] Int. Cl. ...................................................... H01h 35/28,
 H01h 35/32, G08b 29/00
[50] Field of Search .......................................... 200/83,
 83.1, 83.3, 83.2, 83.34, 83.32, 83.91; 340/214,
 410, 242, 236 (Cursory); 116/70 (Cursory);
 73/393, 410, 40

[56] References Cited
 UNITED STATES PATENTS

| 2,357,353 | 9/1944 | Pearce | 340/410X |
| 2,567,519 | 9/1951 | Livingston | 73/410 |
| 3,046,369 | 7/1962 | Hicks | 200/83(.3) |
| 3,092,821 | 6/1963 | Muehlner | 340/242X |
| 3,124,960 | 3/1964 | Clark | 73/410 |
| 3,161,865 | 12/1964 | Lindberg, Jr. | 340/410X |
| 3,172,292 | 3/1965 | Graham et al. | 73/410 |
| 3,269,186 | 8/1966 | Hebenstreit | 73/393 |

FOREIGN PATENTS

| 636,674 | 9/1957 | Canada | 200/83(.3) |

Primary Examiner—H. O. Jones
Assistant Examiner—Robert A. Vanderhye
Attorney—Holman & Stern ABSTRACT: Pressure drop detector which is connectable to a sealed enclosure for detecting leakage from said enclosure and comprising a casing which forms a chamber, a flexible wall element disposed within said chamber and responsive to the pressure existing within said enclosure, and a switching unit controlled by said flexible wall element so as to carry out a reversal of state when the pressure within the enclosure falls as a result of leakage, wherein, in order to compensate for pressure variations arising from variation in the ambient temperature and in order to render the apparatus unresponsive to ambient pressure, said chamber is subdivided into two cavities separated from each other by said flexible wall element, one of said cavities which is utilized for a measurement of pressure being connectable to the enclosure to be monitored while the other cavity is filled with gas at a reference pressure which is substantially in the vicinity of the pressure which prevails within the enclosure to be monitored in order that the variations in ambient temperature should modify the pressure to be checked and the reference pressure in the same manner, the reference cavity having in addition a volume which reduces to a negligible value the variation in volume corresponding to the range of travel of the wall element which is necessary for the operation of the switching unit.

The movable portion of the flexible wall element has a mass which is such that centrifugal force applied to said mass is equal to the variation in the force exerted by the pressure on said portion of the flexible wall. The detector also has a testing means to assure accurate control of the operation and sensitivity of the device.

Patented April 27, 1971
3,576,412
2 Sheets-Sheet 1
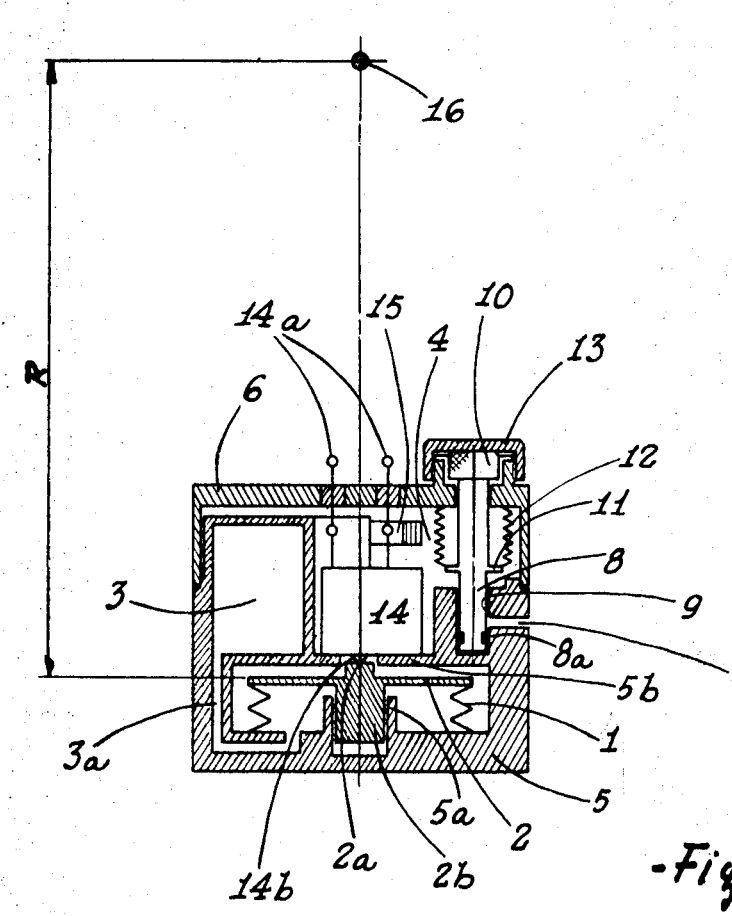
-Fig. 1.-
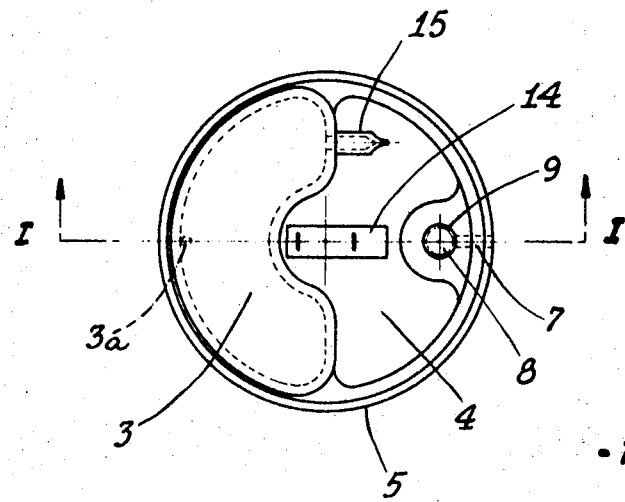
-Fig. 2.-
INVENTOR
JEAN JULLIEN-DAVIN
By Stevens, Downing & Seebold
ATTORNEYS

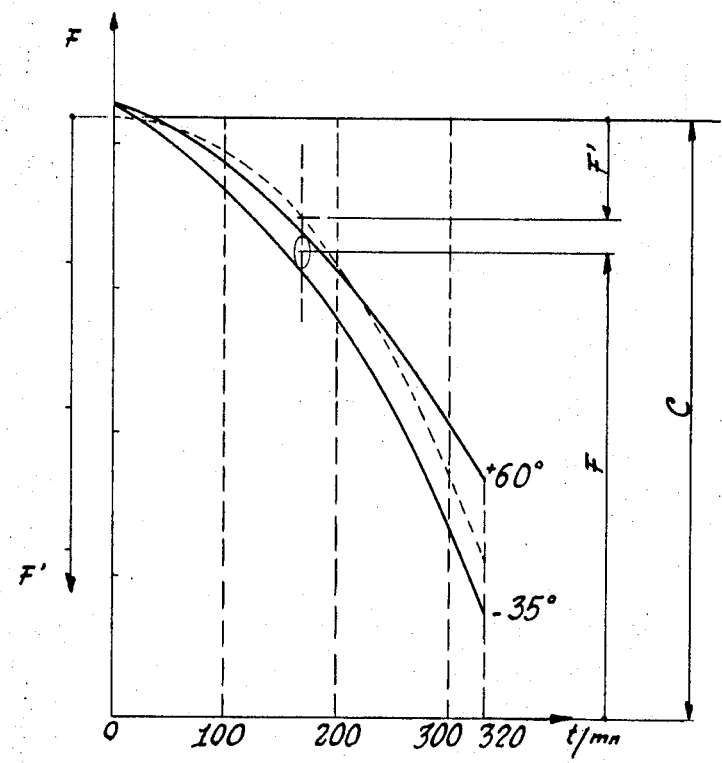
-Fig. 3-

PRESSURE DROP DETECTOR WITH TESTING MEANS, CENTRIFUGAL FORCE COMPENSATING MEANS, AND TEMPERATURE COMPENSATING MEANS

BACKGROUND OF THE INVENTION

The present invention is directed to a pressure drop detector which is intended to provide a warning signal when a leak occurs in a sealed enclosure.

A known type of detector which is referred to as a pressure transducer is already in use and comprises a diaphragm which is sensitive to pressure and which is capable of actuating an electric switch. The design function of this device is to provide a continuous indication of the existence of a given pressure within a pipe or sealed enclosure, the switching unit being intended to open (or close) a contact when the value of the pressure oversteps a predetermined threshold. These known pressure transducers detect any drop in pressure irrespective of its cause. However, in the case of some sealed enclosures which contain a gas under pressure, it can prove necessary to detect pressure drops resulting from leakage but not pressure drops arising from any reversible physical cause if such pressure drops no longer exist when the physical cause is removed. Thus, in the case of the enclosures referred to, it may be essential not to detect: a pressure drop resulting from a decrease in the ambient temperature; a local pressure drop which occurs at a point of the enclosure at which the pressure transducer is located and which results from any particular dynamic regime such as, for example, a rapid rotational motion (in which centrifugal force has the effect of compressing the gas within the sealed enclosure at the end opposite to the location of the detector); an apparent differential pressure drop resulting from an increase in atmospheric pressure or a reduction in altitude; and so forth. If all these conditions are satisfied, any pressure drop which is detected can be considered as a proof of the occurrence of leakage resulting, for example, from damage sustained by the wall of the sealed enclosure.

If the sealed enclosure is constituted by a hollow mechanical component which plays a role of paramount importance in the maintenance of operational safety, it is apparent that a pressure transducer which satisfies the foregoing conditions will serve to provide a warning as soon as the smallest crack appears at any point of the wall of said mechanical component.

The use of a monitoring means for ensuring safety and reliability of equipment makes it essential to ensure that the pressure transducer is wholly reliable both in operation and in accuracy of response. In consequence, and in view of the fact that the operation of an apparatus of this type cannot be strictly guaranteed, it is advisable to ensure that the apparatus is fitted with testing means whereby the operation and fidelity of the apparatus can be checked each time prior to putting this latter into service without thereby causing any loss of pressure and without any risk of damaging said apparatus.

One example of a hollow mechanical component which plays a major part in ensuring safety and which works under very exacting conditions, thereby warranting the application of a monitoring device of the type referred to, is that of the blade spars of helicopter rotors which are known to have a fairly short service life.

SUMMARY OF THE INVENTION

The object of the present invention is to provide a pressure drop detector comprising a flexible wall element (diaphragm or bellows element) which is responsive to the pressure existing within a sealed enclosure and a switching unit controlled by said flexible wall element so as to carry out a reversal of state when the pressure falls below a predetermined value as a result of leakage, said leak detector being characterized in that, in order to compensate for pressure variations arising from a variation in the ambient temperature and in order to render the apparatus unresponsive to the ambient pressure, said apparatus is accordingly provided with two cavities which are separated from each other by the flexible wall element, one of said cavities being employed for the measurement and connected to the enclosure to be monitored while the other cavity is filled with gas at a reference pressure which is substantially in the vicinity of the pressure to be checked in order that the variations in ambient temperature should modify the pressure to be checked and the reference pressure in the same manner, the reference cavity having in addition a volume such as to cause a negligible variation in volume corresponding to the range of travel of the wall element which is necessary for the operation of the switching unit.

In a particular embodiment of the pressure detector which is designed and arranged as indicated in the foregoing, said detector can also have the following properties:

in order to compensate for pressure variations which are produced at the level of the pressure transducer as a result of the rotational motion of the enclosure about an axis, said rotational motion having the effect of increasing the pressure at points remote from said axis and reducing said pressure at points located nearer said axis, a movable portion of the flexible wall element has a mass such that the centrifugal force applied to said mass is equal to the variation of the force exerted by the pressure on said portion of flexible wall of the detector which is also oriented in such a manner as to ensure that the centrifugal force is applied in the direction which compensates for the variation.

It will be noted that, by reason of the fact that centrifugal force varies according to a parabolic law of angular velocity while pressure varies according to an exponential law, there is in principle only one operative speed at which compensation is strictly ensured. In practice, there exits a wide range of operative speeds over which compensation is acceptable; this arises from the fact that, if the two curves (centrifugal force and pressure) are plotted, it becomes apparent that said curves remain very close to each other over a fairly wide range.

In order that the operation and sensitivity of the apparatus may be controlled, the apparatus accordingly comprises a slide valve for isolating the measuring cavity from the sealed enclosure, a plunger which is integral with said slide valve for producing a variation in the volume of the isolated measuring cavity, a metallic bellows element which seals off said plunger with respect to the exterior and can be actuated by means of a control knob, and a safety screwcap being provided for the members aforesaid in the normal position thereof.

The switching unit is of the snap action type and is unresponsive to accelerations and vibrations while the means for guiding the flexible wall element render the apparatus unresponsive to accelerations which are directed transversely, and stationary abutment means being provided for limiting the range of travel of said flexible wall element.

All the properties outlined above will become more readily apparent from the following detailed description, reference being made to the accompanying drawings which illustrate one example of construction of the apparatus, the sealed enclosure being assumed to be a helicopter blade spar having a length of several meters, said enclosure being placed at right angles to the axis of rotation, that extremity of the enclosure which is located nearest the axis being intended to accommodate the apparatus whose movable wall element is a bellows in this example, said bellows being located at a distance R from the axis of rotation.

BRIEF DESCRIPTION OF THE DRAWINGS

In these drawings:

FIG. 1 is a cross-sectional view of the leakage detector taken along line I-I of FIG. 2 and indicates the relative position of the axis of rotation;

FIG. 2 is a top view illustrating the apparatus of FIG. 1 after removal of the cover; and FIG. 3 is a diagram showing the exponential law of pressure variation and the parabolic law of variation of centrifugal force as a function of the velocity of rotation.

DETAILED DESCRIPTION OF THE INVENTION

It is apparent from FIG. 1 that the flexible wall element is a bellows 1 which has a movable end plate 2 and that said element forms a separation between a reference chamber whose volume comprises the interior of the bellows element 1 connected by means of a passageway 3a to a cavity 3 on the one hand and a measuring chamber 4 delimited by the exterior of the bellows element 1, casing or body 5 and cover 6 on the other hand. The measuring chamber 4 is connected to the enclosure to be monitored by means of a duct 7 and the annular space between a slide-valve stem 8 and a bore 9 which is traversed by said stem. The slide-valve stem 8 passes through the cover 6 and is provided externally with a control knob 10 and internally with an annular flange 11 which serves as an end plate for a small bellows seal 12, with the unit consisting of flange 11 and bellows 12 being such as to constitute a leaktight plunger. A safety cap 13 is screwed onto a collar of the casing 5 and maintains the knob 10 in the depressed position so that the bellows unit 11—12 thus takes up the maximum volume within the chamber 4. The measuring chamber 4 contains a snap switch 14, the output terminals of which are connected to external terminals 14a through leaktight lead-in bushings and control pushbutton 14b of which is in contact with a central boss 2a of the end plate 2.

A tubular stem 15 serves to introduce and to seal within the reference chamber (1, 3, 3a) a reference pressure which is either equal or very close to the pressure of the enclosure to be monitored. In the general case, the pressure of the enclosure balances the reference pressure, the bellows element 1 occupies a predetermined position and the switch 14 is in a given state (for example in the closed state so as to operate an indicator lamp). Should a leak occur within the sealed enclosure, the pressure which prevails within the measuring chamber 4 decreases and no longer balances the reference pressure, with the result that the bellows element 1 carries out a movement of extension and actuates the pushbutton 14b of the switch 14 which changes state so as to produce a warning signal. The warning state preferably corresponds to the open circuit condition in order that an electrical failure, burnt out lamp and the like which makes it impossible for the apparatus to perform its monitoring function may be interpreted as a warning.

The device is unresponsive to variations in static pressure and to variations in ambient temperature by virtue of the fact that the pressure to be monitored and the reference pressure (of substantially equal value) vary by the same quantity and that the difference between these pressures remains either zero or very close to zero.

FIG. 1 also shows the relative position of an axis of rotation 16 which is perpendicular to the plane of the figure and the position of the movable end plate 2 of the bellows element which is located at a distance R from the axis 16. Consequently, as is apparent from FIG. 3, the centrifugal force F' which is a parabolic function of the velocity of rotation tends to compress the bellows element. Said force F' thus almost exactly balances the reduction in the force F which is exerted on the bellows element by the pressure to be monitored. This reduction (which is an exponential function of the velocity of rotation) results from the fact that the centrifugal force applied to the gas within the enclosure increases the pressure at points which are remote from the axis and reduces said pressure at points which are close to said axis.

In FIG. 3, the variation in centrifugal force is represented in broken lines and the variations in pressure as a function of the velocity of rotation are represented in full lines; and it is demonstrated by way of example in this FIG. that, at each operative speed between 0 and 320 r.p.m., the sum of the forces F and F' remains substantially equal to a constant C. This virtually perfect compensation is not a fortuitous circumstance. Since the distance R is fixed as well as the characteristics of the sealed enclosure, the mass of the movable end plate 2 can always be chosen so as to ensure that the conditions of FIG. 3 are satisfied.

The mass of the movable end plate 2 can be determined by any one skilled in the art. As a matter of fact, if $\Delta P$ is the pressure variation produced, by the rotation, in the enclosure, at the point where the measure is made, the force F produced on the flexible wall having a surface S, is:

$$F = S\Delta P$$

R and F being known, the mass M to be chosen for the flexible wall, in order that the centrifugal force F' is equal and opposite to F is given by the formula $$F = Mw^2 R.$$

($w$ = angular speed)

FIG. 1 also shows the operation of the testing system:

When the cap 13 is unscrewed, the knob 10 is released. The pressure which prevails within the chamber 4 has the effect of compressing the bellows element 12; the sealing ring 8a of the slide valve 8 moves above the duct 7, thus isolating the measuring chamber 4 from the sealed enclosure. When the compression of the bellows element 12 is continued, the volume of the chamber 4 increases and the pressure which prevails therein decreases to a sufficient extent to initiate the operation of the switch 14. On completion of the testing operation, and when the screwcap 13 has been replaced, the gas within the chamber 4 is again compressed and said chamber is again put into communication with the enclosure to be monitored.

FIG. 1 also shows that the end plate 2 is rigidly fixed to a cylindrical rod 2b which is slidably mounted within a guide 5a of the frame 5 in order to render the bellows element unresponsive to accelerations and transverse vibrations. A partition wall 5b serves to limit the travel of the bellows element and, at the time of construction of the apparatus, to introduce into the reference chamber the gas which produces the reference pressure, whereupon said chamber can be sealed without any danger of causing damage to the bellows element in the event of insufficient pressure within the measuring chamber.

FIG. 2 shows the manner in which the cavity 3 can be arranged for the purpose of providing a sufficient space for the switch 14 within a given volume and providing the reference chamber with a volume which is as large as possible at the expense of the volume of the measuring chamber, thereby permitting extreme miniaturization of the testing elements, namely the bellows element 12 and the slide valve 8.

I claim:

1. In a pressure drop detector which is connectable to a sealed enclosure for detecting leakage from said enclosure and comprising a casing which forms a chamber, a flexible wall element disposed within said chamber and responsive to the pressure existing within said enclosure, and a switching unit controlled by said flexible wall element so as to carry out a reversal of state when the pressure within the enclosure falls as a result of leakage, wherein, in order to compensate for pressure variations arising from variation in the ambient temperature and in order to render the apparatus unresponsive to ambient pressure, said chamber is subdivided into two cavities separated from each other by said flexible wall element, one of said cavities which is utilized for a measurement of pressure being connectable to the enclosure to be monitored while the other cavity is filled with gas at a reference pressure which is substantially in the vicinity of the pressure which prevails within the enclosure to be monitored in order that the variations in ambient temperature should modify the pressure to be checked and the reference pressure in the same manner, the reference cavity having in addition a volume which reduces to a negligible value the variation in volume corresponding to the range of travel of the wall element which is necessary for the operation of the switching unit, and wherein, in order to compensate for pressure variations resulting from the movement of rotation of the enclosure about an axis, a movable portion of the flexible wall element has a mass which is such that centrifugal force applied to said mass is equal to the variation in the force exerted by the pressure on said portion of the flexible wall of the detector, and said movable flexible wall portion being additionally oriented so that centrifugal force is applied in the direction which compensates for the variation.

2. A pressure drop detector which is connectable to a sealed enclosure for detecting leakage from said enclosure and comprising a casing which forms a chamber, a flexible wall element disposed within said chamber and responsive to the pressure existing within said enclosure, and a switching unit controlled by said flexible wall element so as to carry out a reversal of state when the pressure within the enclosure falls as a result of leakage, wherein, in order to compensate for pressure variations arising from variation in the ambient temperature and in order to render the apparatus unresponsive to the ambient pressure, said chamber is subdivided into two cavities separated from each other by said flexible wall element, one of said cavities which is utilized for a measurement of pressure being connectable to the enclosure to be monitored while the other cavity is filled with gas at a reference pressure which is substantially in the vicinity of the pressure which prevails within the enclosure to be monitored in order that the variations in ambient temperature should modify the pressure to be checked and the reference pressure in the same manner, the reference cavity having in addition a volume which reduces to a negligible value the variation in volume corresponding to the range of travel of the wall element which is necessary for the operation of the switching unit, wherein, in order to control the operation and sensitivity thereof, said detector comprises a slide valve for the purpose of isolating the measuring cavity from the sealed enclosure to be monitored, a plunger which is integral with said slide valve for varying the volume of the measuring cavity which is isolated from said enclosure, a metallic bellows element which is connected to said casing and to said plunger for ensuring the imperviousness thereof with respect to the exterior, a control knob located outside said casing and rigidly fixed to said plunger, and a safety cap which is screwable on said casing over the aforesaid control knob in the normally depressed position thereof.

3. The pressure drop detector as defined in claim 2, wherein the switching unit is of the snap-action type and is unresponsive to accelerations and to vibrations while the casing comprises means for guiding the flexible wall element so that the detector should be unresponsive to accelerations which are directed transversely, and stationary abutment means for limiting the range of travel of said flexible wall element.